United States Patent [19]

Sparks

[11] 4,386,660
[45] Jun. 7, 1983

[54] HORSESHOE FOR A THOROUGHBRED

[75] Inventor: Jimmy L. Sparks, Norco, Calif.

[73] Assignees: William Ray Lawson; Jarald Allen Phillips, both of Norco, Calif. ; part interest to each

[21] Appl. No.: 287,174

[22] Filed: Jul. 27, 1981

[51] Int. Cl.³ .............................................. A01L 7/04
[52] U.S. Cl. ....................................................... 168/32
[58] Field of Search ...................... 168/17, 20, 29, 31, 168/32, 36, 37, 40

[56] References Cited

U.S. PATENT DOCUMENTS

| 492,460 | 2/1893 | Crannell | 168/17 |
|---|---|---|---|
| 639,248 | 12/1899 | Kerekes | 168/17 |
| 1,040,958 | 10/1912 | Ketterer | 168/29 |
| 1,342,615 | 6/1920 | Ariuchi | 168/31 |

Primary Examiner—Robert P. Swiatek
Attorney, Agent, or Firm—Frank D. Gilliam

[57] ABSTRACT

An improved horseshoe for a thoroughbred horse having a front calk comprising an integral pair of holding members on opposite surface of the horseshoe for the removable securing of a second calk positioned transversely to the longitudinal axis, within the width of the horseshoe and within the forward half of the horseshoe. The turf gripping surface of the second calk is generally positioned closer to the horse's hoof surface than the turf gripping surface of the first calk.

13 Claims, 8 Drawing Figures

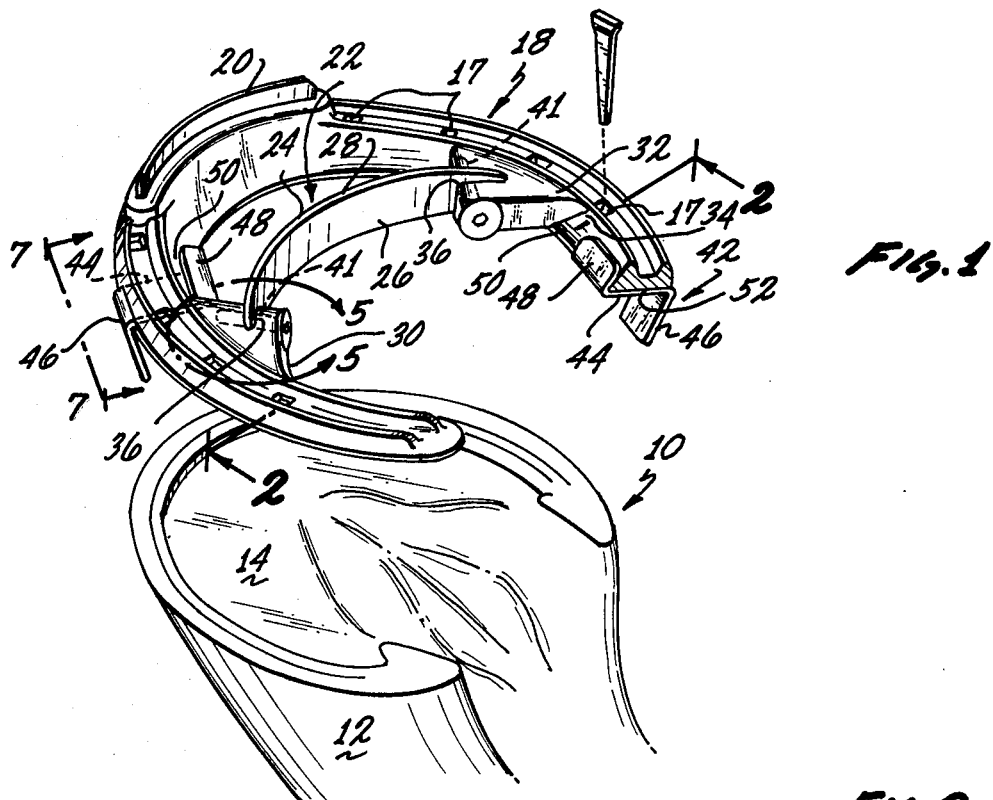
Fig. 1
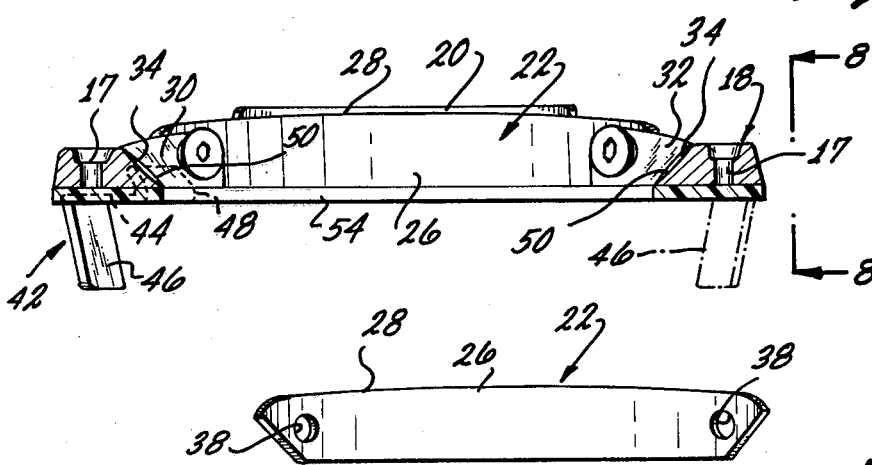
Fig. 2
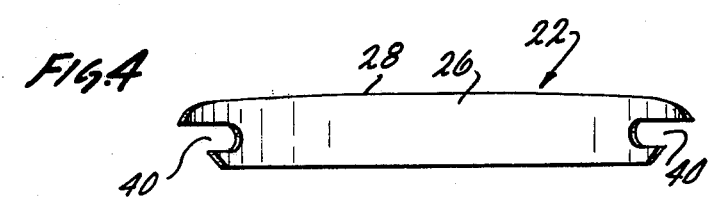
Fig. 3
Fig. 4

4,386,660

HORSESHOE FOR A THOROUGHBRED

BACKGROUND OF THE INVENTION

Typical race horseshoes are lightweight, made of a minimum of material and have a single calk at the forward end. This calk provides the primary means by which the horse achieves traction in the turf. One of the problems with such horseshoes is that they provide a minimum means for achieving such traction.

A second calk was added as an accessory to the horseshoe by means of a plate positioned between the horse's hoof and the hoof contacting surface of a conventional race horseshoe. This plate covered only a portion of the horse's hoof and therefore required shims between the horse's hoof and the horseshoe in those areas not covered by the plate to build up the thickness of the horseshoe equal to the thickness of the plate so that the horseshoe could be nailed over the plate along a level plane adjacent the horse hoof attachment surface. This means for including the second calk was inadequate in that a multiplicity of parts and individual forming of the parts were required in addition to forming the horseshoe when mounting on a hoof, the maintenance of horseshoe/hoof alignment was difficult in that relative movement between the plate, horseshoe and hoof frequently occurred and most significant the second calk could not be removed and replaced without the removal of the horseshoe. This made selective removal and replacement of the second calk for different track conditions or for any other reason virtually impossible.

A horseshoe with a selectively removable second calk as an integral part thereof was not available until the emergence of the instant invention.

SUMMARY OF THE INVENTION

According to the present invention, it has been found that the selective addition of a second calk to a conventional horseshoe under certain turf conditions substantially increases the speed of the horse by the additional traction obtained thereby. Under some racing and nonracing conditions it has been found that removal of the second calk is desirable. If the second calk is damaged in any manner it can be easily removed and replaced with a new calk without necessitating removal of the horseshoe as is required of the prior art device.

It has been found that a second calk can be removably secured to a conventional horseshoe by forming second calk holding means integral with the horseshoe on the turf contacting surface thereof. The holding means are in the form of opposing shoulders on each turf engaging surface of the horseshoe. The shoulders have slots therein for receiving at least the outer ends of the second calk. The outer ends of the second calk have securing means thereon, such as, but not limited to, slots or apertures. When the second calk is inserted into the shoulder slots a removable keeper passes through the shoulder and is utilized on each vertical side of the slot and through the slot or aperture in the ends of the second calk and is then locked in position thereby removably securing the second calk to the horseshoe.

Race horseshoes are manufactured in many sizes, therefore, the second calk will have as many different overall lengths as there are different widths of race horseshoes.

Accordingly, it is an object of the invention to provide an improved means for the increasing traction of race horseshoes.

It is still another object of the invention to provide a second calk that is easily removable from and replaceable for a conventional type race horseshoe.

It is still another object of this invention to provide a clip to be used in combination with a conventional horseshoe to provide and maintain proper alignment of a horseshoe on a horse's hoof.

These and other objects and advantages of the invention will become better understood by reference to the following detailed description. When considered with the drawings, in which:

BRIEF DESCRIPTION OF THE DRAWINGS

FIG. 1 is a perspective view showing a horse's hoof including a typical horseshoe with the second calk and alignment clip installed;

FIG. 2 is a view of FIG. 1 taken along line 2—2;

FIG. 3 is a showing of one embodiment of the second calk;

FIG. 4 is a showing of a second embodiment of the second calk;

DETAILED DESCRIPTION OF THE PREFERRED EMBODIMENT

Figure 5:
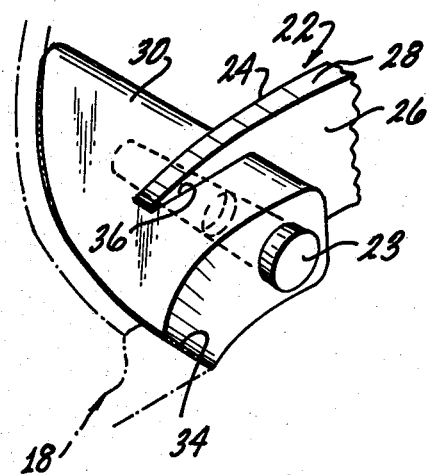
FIG. 5 is a showing taken along line 5—5 of FIG. 1.

Referring now to the various figures, FIG. 1 depicts a horse's hoof 10 having a horny wall 12 and a bottom surface or sole 14 into which the horseshoe nails are driven through apertures 17 to hold the horseshoe 18 snugly and firmly to the sole 14.

The horseshoe 18 shown is a typical race horseshoe which has a forward or toe calk 20.

Positioned rearward from the toe calk 20 is a second or intermediate calk 22. The second calk 22 is somewhat longer in length than the front calk 20 and spans across the transverse width of the horseshoe, at its attachment locations. The calk 22, like calk 20, has a convex front face 24 and a rearward concave face 26. The faces terminate downward from the hoof in a curved edge 28.

The secnd calk 22 is held in position by a pair of opposing holding members 30, 32. These holding members 30, 32 are secured firmly to the lower horseshoe surface by any convenient means, such as but not limited to, welding, brazing, diffusion bonding and the like, or riveted, bolted, screwed, or the like. Preferably, however, the holding members 30, 32 are made an integral part of the horseshoe when the horseshoe is manufactured. The holding members generally will have a profile close to the inner surface slanted portion 34 of the horseshoe so that they will have no effect on the general feel of the horseshoe to the horse.

A slot 36 is formed in each holding member. This slot at least partially passes through the body of the holding member.

The second calk conforms to the slots 36 in the holding members for insertion therein. Referring now to FIGS. 3 and 4, two embodiments of calk 22 are shown. One embodiment has apertures 38 passing through each end thereof and the second embodiment has elongated slots 40 through each end thereof. These apertures or slots 38, 40 are utilized to lock the calk 22 to the holding members 30, 32 when the calk 22 is inserted in slots 36 in an operable position. The slots further provide length adjustments for the second calk to allow for horseshoe width adjustment according to different widths of different horse hoofs.

Referring now to FIGS. 1, 2 and 5, each holding member 30, 32 has a longitudinal bore therein. This bore 41 can be either threaded as in FIG. 1 for receiving a threaded screw as shown or may be tapered as shown in FIG. 5 along its length to receive a tapered pin therein. When a screw is utilized to hold the calk 22 in place it is threaded into the bore through both sides of the slot 36. When a tapered pin 23 is utilized to hold the calk 22 in place it is driven into the bore through both sides of the slot. Other suitable means may be utilized to removably secure the calk 22 in place on the shoe while practicing the invention.

The forward calk on the horseshoe extends substantially farther outwardly or downwardly from the horseshoe than the second calk 22. Thus, the greater bite into the turf is taken by the forward calk 20 and a lesser bite is taken by the second calk 22. However, because the turf is quite deep and loose, the second calk is in position to achieve substantial traction, and the two calks together greatly improve the traction so as to permit the horse to substantially increase its running speed.

It should be understood that there are certain track conditions and off track conditions that will not necessarily require the second calk 22 to be in place on the horseshoe. Under these conditions the second calk can be easily removed by removing the securing means (screw or pin) and slipping the calk from the holding members. Likewise, when the second calk is again needed it can easily be re-inserted into and locked onto the holding members.

Figure 6:
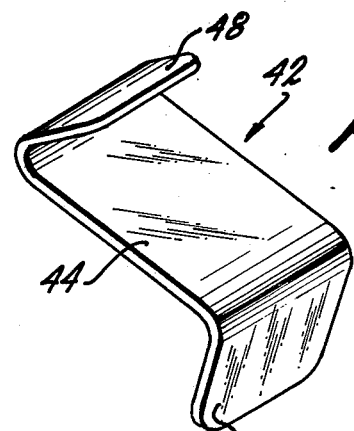
FIG. 6 is a perspective showing of the hoof/shoe alignment clip.
Figure 7:
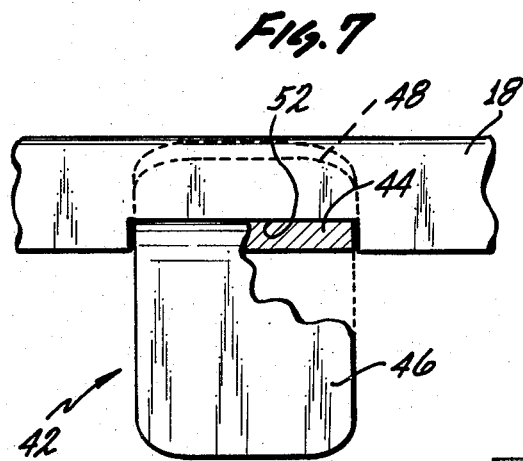
FIG. 7 is a showing taken along line 7—7 of FIG. 1.
Figure 8:
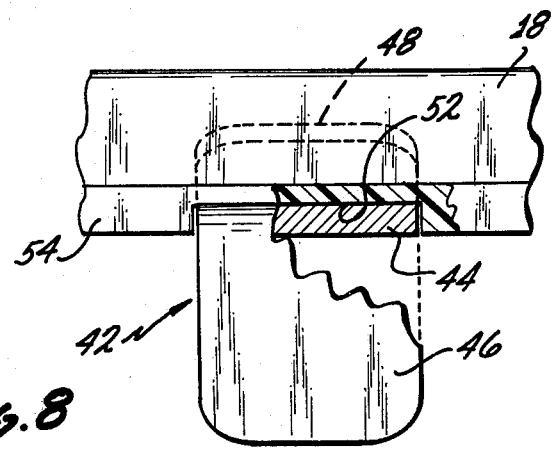
FIG. 8 is a showing taken along 8—8 of FIG. 2.

Referring now to the various Figures wherein a hoof/horseshoe retaining clip 42 is shown. The clip 42 is formed wherein a central flat body portion 44 passes between the horseshoe and the sole 14 of the hoof, an upwardly formed surface 46 extends along the outer surface of the lower hoof side wall and an downwardly and sometimes inwardly formed surface 48 grips the inner surface 50 of the horseshoe (see FIGS. 1, 2 and 6). The upwardly and sometimes inwardly formed surface may be formed to grip the slanted surface of the horseshoe as shown in the figures or may be vertical to grip the inner planar wall of a work horseshoe (not shown). A notch 52 is provided in the hoof adjacent surface of the horseshoe (see FIG. 7) to receive the clip's central flat body portion 44 so that the hoof contacting surface of the horseshoe 18 and clip 42 combination is planar. Those horseshoes that include a resilient pad 54 (see FIG. 8) on the hoof contact surface would have the notch 52 in the resilient pad 54 rather than the actual horseshoe/hoof contacting surface or could be as above explained with the central flat body portion 44 forming a gasket between the hoof and horseshoe. The clip may be constructed of any suitable material for the purpose intended. Examples of such material would include various types of steel, bronze, etc. Mild rolled steel is preferred.

The invention and its attendant advantages will be understood from the foregoing description and it will be apparent that various changes may be made in the form, construction and arrangements of the parts of the invention without departing from the spirit and scope thereof or sacrificing its material advantages, the arrangements hereinbefore described being merely by way of example. There is no intent to be restricted to the specific form shown or uses mentioned except as defined in the accompanying claims, wherein various portions have been separated for clarity of reading and not for emphasis.

What is claimed is:

1. An improved race horseshoe including a front end calk, comprising: a second calk having a downwardly directed configuration similar to said front end calk, said second calk comprising a blade removably insertable into engaging slots in holding members with locking means fixedly secured to said horseshoe for removably locking said second calk to said horseshoe.

2. The invention as defined in claim 1 wherein said second calk comprises a curvilinear blade member removably insertable into holding members fixedly secured to said horseshoe.

3. The invention as defined in claim 1 wherein said locking means comprises keepers within said holding members for engaging said second calk and holding said second calk within said slots.

4. The invention as defined in claim 3 wherein said second calk has apertures at each end for engaging said locking means.

5. The invention as defined in claim 3 wherein said second calk has elongated slots in each end for engaging said locking means.

6. The invention as defined in claim 3, 4 or 5 wherein said removable locking means are screws.

7. The invention as defined in claim 1 wherein at least two gripping and aligning clips are positioned for engagement between said horseshoe and said hoof, said clips being configured to grip said horseshoe and the outer surface of said hoof.

8. The invention as defined in claim 7 wherein the hoof adjacent surface of said horseshoe includes recesses to accommodate said clips whereby the surface of said horseshoe and the outer hoof adjacent surface of said clips in said recesses lie on a substantially common plane.

9. The invention as defined in claim 1 wherein at least two gripping and aligning clips are positioned between said horseshoe and said hoof, said clips being configured to grip at least the inner surface of said horseshoe, pass between said horseshoe and said hoof and grip the outer surface of said hoof.

10. The invention as defined in claim 7 or 9 wherein each of the said gripping and aligning clips comprises:
    a central flat portion for passing between the hoof of the horse and the horseshoe, each clip located in a cutout in the hoof contacting surface of the horseshoe, the hoof contacting surface of the clip and horseshoe forming a substantially planar surface;
    an upwardly extending surface connected to said central flat portion engaging the lower side surface of said hoof; and
    a downwardly extending surface connected to said central flat portion remote from said upwardly extending surface for gripping the inner surface of said horseshoe.

11. The invention as defined in claim 10 wherein said clips are constructed of mild steel.

12. The invention as defined in claim 10 wherein said horseshoe includes a resilient pad positioned between the hoof and the hoof adjacent surface of the horseshoe and said cutout is in said pad and the entire hoof adjacent surface of said horseshoe is substantially planar.

13. The invention as defined in claim 10 wherein said clips are formable after installation so as to conform to the inner surface of said horseshoe.

* * * * *